(12) United States Patent
Yamada et al.

(10) Patent No.: US 10,794,779 B2
(45) Date of Patent: Oct. 6, 2020

(54) PRESSURE SENSOR (71) Applicant: KITAGAWA INDUSTRIES CO., LTD., Aichi (JP)

(72) Inventors: Kazuki Yamada, Aichi (JP); Yasuo Kondo, Aichi (JP)

(73) Assignee: KITAGAWA INDUSTRIES CO., LTD., Aichi (JP)

( * ) Notice: Subject to any disclaimer, the term of this patent is extended or adjusted under 35 U.S.C. 154(b) by 0 days.

(21) Appl. No.: 16/471,486

(22) PCT Filed: Dec. 5, 2017

(86) PCT No.: PCT/JP2017/043704
§ 371 (c)(1),
(2) Date: Jun. 19, 2019

(87) PCT Pub. No.: WO2018/116821
PCT Pub. Date: Jun. 28, 2018

(65) Prior Publication Data
US 2019/0391024 A1 Dec. 26, 2019

(30) Foreign Application Priority Data
Dec. 20, 2016 (JP) .................. 2016-246653

(51) Int. Cl.
*G01L 1/00* (2006.01)
*G01L 1/22* (2006.01)
(Continued)

(52) U.S. Cl.
CPC ............ *G01L 1/2287* (2013.01); *G01L 1/146* (2013.01); *G01L 1/205* (2013.01); *G01L 9/0002* (2013.01)

(58) Field of Classification Search
CPC ....... G01L 1/146; G01L 1/205; G01L 9/0002; G01L 9/02
(Continued)

(56) References Cited

U.S. PATENT DOCUMENTS 3,830,991 A    8/1974   Durocher
4,017,697 A    4/1977   Larson
(Continued)

FOREIGN PATENT DOCUMENTS

CN      101292312 A    10/2008
JP       S54-030356      9/1980
(Continued)

OTHER PUBLICATIONS

Form PCT/IB/338 issued in corresponding application No. PCT/JP2017/040291, 1 pg.
(Continued)

*Primary Examiner* — Max H Noori
(74) *Attorney, Agent, or Firm* — Meunier Carlin & Curfman LLC (57) ABSTRACT

Object:
To provide a pressure sensor that can provide a reduced sensation of a foreign body and that has a good sensitivity to pressure from a low load region to a high load region.
Resolution means:
The pressure sensor includes a variable resistor and a plurality of electrodes. The variable resistor is made of an electrically conductive foam elastomer material. The electrically conductive foam elastomer material is a material imparted with electrical conductivity by dispersing electrically conductive fillers into an elastomer material and obtained by foaming the elastomer material. The plurality of electrodes are disposed at intervals from each other on one surface in contact with the variable resistor.

10 Claims, 6 Drawing Sheets

(51) Int. Cl.
*G01L 1/20* (2006.01)
*G01L 1/14* (2006.01)
*G01L 9/00* (2006.01)

(58) Field of Classification Search
USPC .................................................. 73/862.629
See application file for complete search history.

(56) References Cited

U.S. PATENT DOCUMENTS

| | | | |
|---|---|---|---|
| 6,483,055 | B1 | 11/2002 | Tanabe |
| 7,112,755 | B2 | 9/2006 | Kitano |
| 7,528,337 | B2 | 5/2009 | Tanabe |
| 7,772,960 | B2 | 8/2010 | Baker |
| 8,310,017 | B2 | 11/2012 | Mori |
| 8,368,505 | B2 | 2/2013 | Deppiesse |
| 9,453,774 | B2 * | 9/2016 | Bao ..................... G01L 7/041 |
| 9,625,330 | B2 * | 4/2017 | Park ..................... G01L 1/205 |
| 10,192,830 | B2 * | 1/2019 | Rogers ................. H01L 24/97 |
| 2003/0024113 | A1 * | 2/2003 | Scher .................. H05K 3/325 29/840 |
| 2003/0151103 | A1 | 8/2003 | Endo et al. |
| 2004/0217671 | A1 * | 11/2004 | Rosenthal .......... H01L 41/0986 310/328 |
| 2004/0222968 | A1 | 11/2004 | Endo et al. |
| 2006/0131158 | A1 | 6/2006 | Takiguchi |
| 2007/0022828 | A1 | 2/2007 | Divigalpitiya |
| 2009/0151475 | A1 * | 6/2009 | Masaki ................. G01L 1/146 73/862.68 |
| 2010/0024573 | A1 * | 2/2010 | Daverman ............ G06F 3/044 73/862.626 |
| 2010/0033196 | A1 * | 2/2010 | Hayakawa ............ G01L 1/142 324/686 |
| 2010/0050784 | A1 | 3/2010 | Joung |
| 2010/0201650 | A1 * | 8/2010 | Son ..................... G06F 3/044 345/174 |
| 2011/0084346 | A1 | 4/2011 | Mori |
| 2013/0102930 | A1 * | 4/2013 | Connor ................ A61B 1/267 600/590 |
| 2014/0076063 | A1 | 3/2014 | Lisseman et al. |
| 2019/0128753 | A1 * | 5/2019 | Yamada ................. G01L 9/02 |

FOREIGN PATENT DOCUMENTS

| | | |
|---|---|---|
| JP | S55131707 U | 9/1980 |
| JP | H09159402 A | 6/1997 |
| JP | H1183644 A | 3/1999 |
| JP | 2003242849 A | 8/2003 |
| JP | 2009503867 A | 1/2009 |
| JP | 2010230647 A | 10/2010 |
| JP | 2015531877 A | 11/2015 |

OTHER PUBLICATIONS

Form PCT/IB/373 issued in corresponding application No. PCT/JP2017/040291, 1 pg.
Form PCT/ISA/237 (Translation) issued in corresponding application No. PCT/JP2017/040291, 7 pgs.
International Preliminary Report on Patentability issued for International Application No. PCT/JP2017/043704, 15 pages. English translation included.
Non-Final Office Action issued in corresponding U.S. Appl. No. 16/349,161, dated Sep. 17, 2019, 8 pgs.
JP H1183644 (also filed as JP H09-260964, Fukumura et al., Mar. 1999. Machine translation of Description (Year: 1999).
International Search Report issued by the International Searching Authority (JP) in Application No. PCT/JP2017/040291; dated Dec. 5, 2017; 2 pages.
Nternational Search Report issued by the International Searching Authority (JP) in Application No. PCT/JP2017/043704; dated Feb. 27, 2018; 2 pages.
Written Opinion of the International Searching Authority (JP) in Application No. PCT/JP2017/043704; dated Feb. 27, 2018; 5 pages.
Chinese First Office Action dated Jun. 29, 2020 for Application No. 201780069920.0.
Notice of Reasons for Refusal dated Jun. 29, 2020 for Application No. 2016-246653.
Notice of Reasons for Refusal dated Jun. 3, 2020 for Application No. 2016-220696.
First Office Action, issued in corresponding Chinese Application No. 201780078875.5, dated Jul. 22, 2020.

* cited by examiner

PRESSURE SENSOR

TECHNICAL FIELD

The present disclosure relates to pressure sensors.

BACKGROUND ART

A pressure sensor configured such that a pair of interdigital electrodes and a resistor layer are stacked has been known (for example, see Patent Literature 1). In such a pressure sensor, a slight gap is defined between the interdigital electrodes and the resistor layer, and as a load applied in the stacking direction of the interdigital electrodes and the resistor layer increases, the surface area of contact between the interdigital electrodes and the resistor layer increases. With this configuration, an increase in the load applied to the pressure sensor reduces electric resistance between one interdigital electrode and the other interdigital electrode, by the amount of the increase in the surface area of contact between the interdigital electrodes and the resistor layer. By reading this change in the electric resistance, pressure applied to the pressure sensor can be measured.

CITATION LIST

Patent Literature

Patent Literature 1: JP 2010-230647 A

SUMMARY OF INVENTION

Technical Problem

The pressure sensor as described above mostly has a pressure sensitive portion including a hard surface. As a result, in a case that the pressure sensor is attached to a portion to be touched by a person, the person may have a sensation of a foreign body, and it is desired to reduce such a sensation of a foreign body. For a sensor other than the pressure sensor, a countermeasure can be provided as a method of reducing such a sensation of a foreign body, for example, by attaching a soft member such as a sponge to a surface of a hard portion to mitigate the sensation of a foreign body.

However, in the case of the pressure sensor, a soft member such as a sponge attached to a pressure sensitive portion may decrease the pressure detection precision. Further, in the case that the soft member is attached to the pressure sensitive portion, a range from a lower limit value to an upper limit value where pressure can be detected may be reduced. Furthermore, for the pressure sensor as described above, a problem also arises in which, when a certain degree of pressure is applied, the electric resistance decreases sharply, and a change in the electric resistance becomes small in a higher load region.

According to an aspect of the present disclosure, it is desirable to provide a pressure sensor that can provide a reduced sensation of a foreign body and that has a good sensitivity to pressure from a low load region to a high load region.

Solution to Problem

A pressure sensor according to an aspect of the present disclosure includes: a variable resistor made of an electrically conductive foam elastomer material that is a material imparted with electrical conductivity by dispersing electrically conductive fillers into an elastomer material and obtained by foaming the elastomer material, the variable resistor being configured to be compressed depending on pressure in a case that the variable resistor is applied with pressure, an electrical resistance of the variable resistor decreasing with a compression amount; and a plurality of electrodes disposed at intervals from each other on one surface in contact with the variable resistor. In a case where the centers of the respective electrodes are connected with a plurality of imaginary line segments not intersecting with each other and where a plurality of triangular areas are defined by the plurality of imaginary line segments, the plurality of electrodes are disposed such that at positions corresponding to vertexes of each of the plurality of triangular areas, at least one of three electrodes of the plurality of electrodes is a signal electrode and at least one of the three electrodes is a ground electrode.

According to the pressure sensor configured in this manner, the variable resistor is made of the electrically conductive foam elastomer material. Thus, the surface of a pressure sensitive portion can be made soft compared with a pressure sensor configured with a non-foaming conductive material (for example, conductive rubber or the like). Therefore, such a pressure sensor can provide a reduced sensation of a foreign body even when being placed on a portion to be touched by a person.

Additionally, the pressure sensor according to the present disclosure is configured such that the electrical resistance of the variable resistor decreases with the compression amount. Therefore, unlike a pressure sensor configured such that the electrical resistance decreases with the contact area between interdigital electrodes and a resistor layer, the electrical resistance of the variable resistor changes depending on a change in the compression amount of the variable resistor. In addition, the pressure sensor according to the present disclosure is configured such that the plurality of electrodes are disposed at the characteristic positions described above. This can minimize a sharp decrease in the electrical resistance when a certain amount of pressure is applied, and the electrical resistance appropriately changes from a low load region to a high load region. As a result, pressure can be appropriately detected from the low load region to the high load region.

DESCRIPTION OF EMBODIMENTS

The above-described pressure sensor will now be described using exemplary embodiments.

Configuration of Pressure Sensor

Figure 1A:
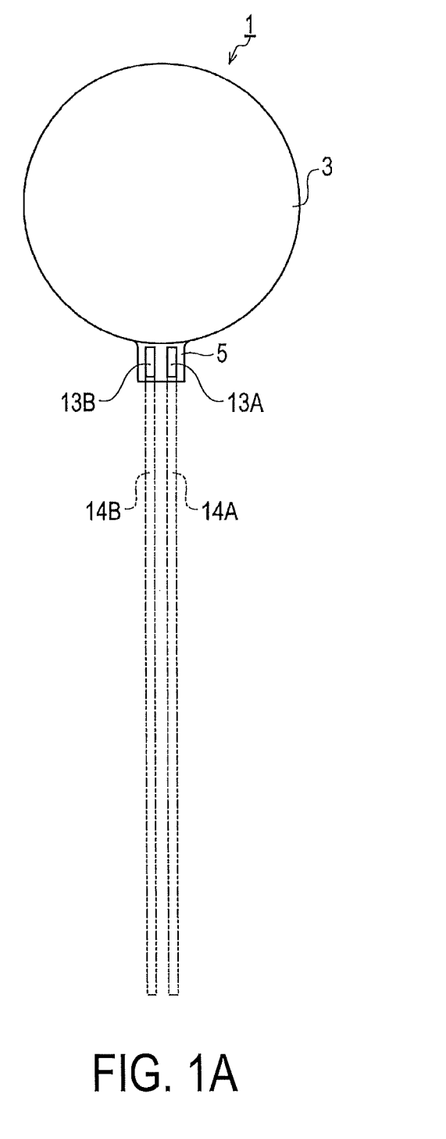
FIG. 1A is a front view of a pressure sensor.
Figure 1B:
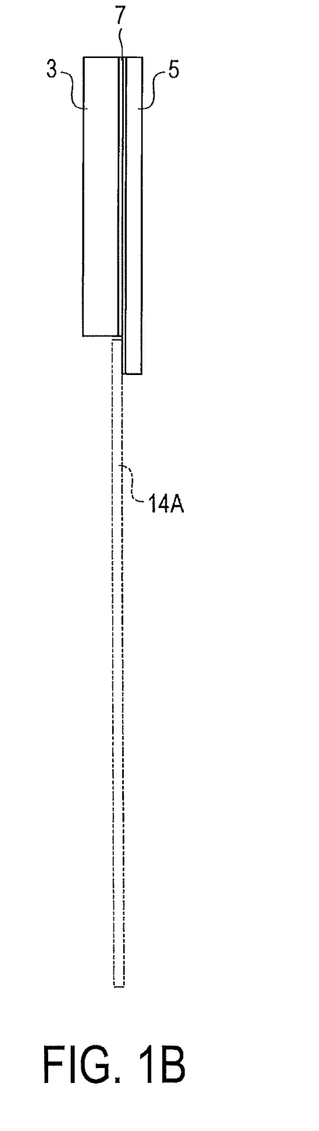
FIG. 1B is a right side view of the pressure sensor.

As illustrated in FIGS. 1A and 1B, a pressure sensor 1 includes a variable resistor 3, an electrode substrate 5, and a spacer 7. The variable resistor 3 is made of an electrically conductive foam elastomer material. The electrically conductive foam elastomer material is a material imparted with electrical conductivity by dispersing carbon fibers into an elastomer material and a material obtained by foaming the elastomer material.

More specifically, the present embodiment uses, as the elastomer material, elastomer material obtained by formulating styrenic elastomer (styrene-ethylene-ethylene-propylene-styrene block copolymer (SEEPS) having a molecular weight of 100000 and a styrene content of 30 mass % and available from Kuraray Co., Ltd. under the product name of SEPTON (trade name) 4033) and hydrocarbon-based process oil (paraffin-based process oil having a kinematic viscosity of 30.9 mm$^2$/s at 40° C., a molecular weight of 400, and a SP value of 7.4) as a softener (in a formulation ratio of 22.8 parts by mass of SEEPS and 77.2 parts by mass of the hydrocarbon-based process oil). Vapor grown carbon fibers (having an average fiber diameter of 0.15 μm, a fiber length from 10 to 20 μm, and an aspect ratio from 66.7 to 133.3, and available from SHOWA DENKO K.K. under the product name of VGCF (trade name)-H) are used as the carbon fibers. A commercially available foaming agent (available from Dainichiseika Color & Chemicals Mfg. Co., Ltd. under the product name of Daifoam H850) is also formulated to foam the elastomer material.

In the present embodiment, the above-described materials are mixed in a formulation ratio of 35 parts by mass of the vapor grown carbon fibers and 3 parts by mass of the foaming agent with respect to 100 parts by mass of the elastomer material. The resultant mixture is extruded with a twin screw extruder to obtain a molded article of the electrically conductive foam elastomer material containing an infinite number of closed cells. In the present embodiment, the electrically conductive foam elastomer material has an expansion ratio of 2.01 times. The variable resistor 3 having a planar shape is configured with such an electrically conductive foam elastomer material. When pressure is applied to the variable resistor 3, the variable resistor 3 is compressed depending on the pressure. As the compression amount increases, the electric resistance of the variable resistor 3 decreases. Additionally, in the present embodiment, the variable resistor is configured in a disc shape having a diameter of 18 mm and a thickness of 2.5 mm.

Figure 2A:
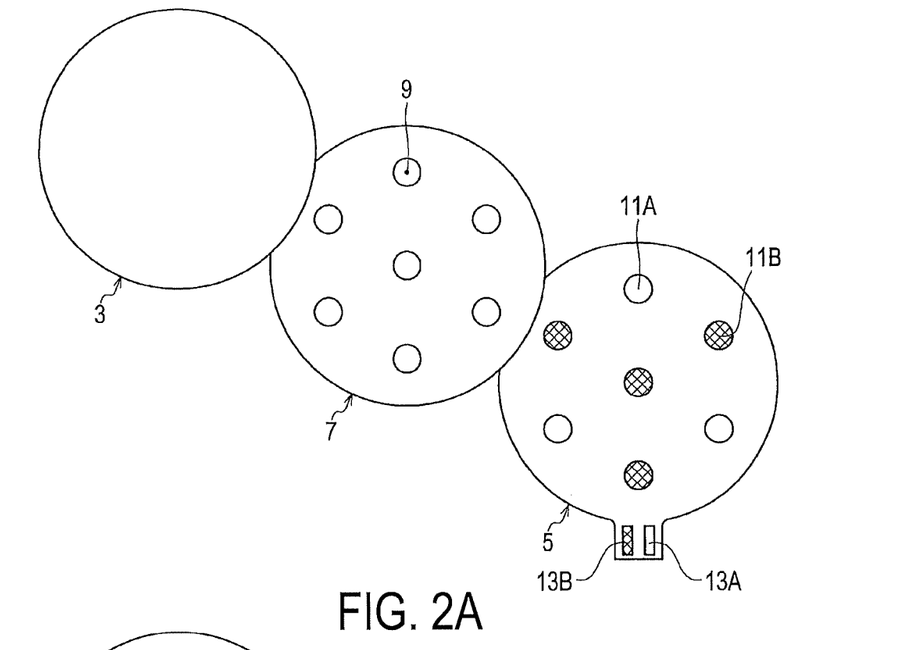
FIG. 2A is an exploded explanatory diagram illustrating a main part of a pressure sensor.

As illustrated in FIG. 2A, the electrode substrate 5 includes three signal electrodes 11A, four ground electrodes 11B, a signal terminal 13A, and a ground terminal 13B. Lead wires 14A, 14B (or flexible flat cables or the like) each having a desired length may be connected to the signal terminal 13A and the ground terminal 13B. Note that the actual pressure sensor 1 is configured such that the signal electrode 11A and the ground electrode 11B differ only in the positions where the signal electrodes 11A and the ground electrodes 11B are each disposed, and there is no difference in appearance between the signal electrode 11A and the ground electrode 11B. However, the ground electrodes 11B are illustrated with the shaded areas in FIG. 2A and the like in order to allow the signal electrode 11A and the ground electrode 11B to be easily distinguished from each other. Likewise, for the signal terminal 13A and the ground terminal 13B, the ground terminal 13B is illustrated with the shaded area for the same purpose as that for the signal electrode 11A and the ground electrode 11B.

Figure 2B:
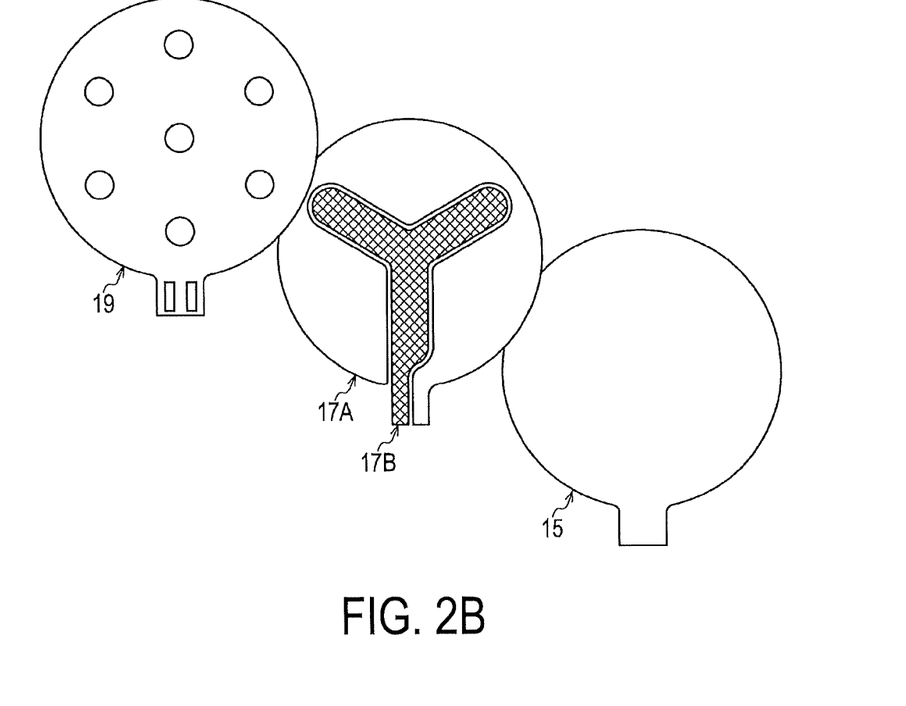
FIG. 2B is an exploded explanatory diagram illustrating an electrode substrate.

Further, as illustrated in FIG. 2B, the electrode substrate 5 has a three-layer structure and includes a base member 15 which serves as a first layer, a first electrically conductive portion 17A and a second electrically conductive portion 17B which serve as a second layer, and an insulating layer 19 which serves as a third layer. In the present embodiment, each of the base member 15, the first electrically conductive portion 17A, and the second electrically conductive portion 17B is configured with a glass epoxy substrate. In other words, the base member 15 is configured with a prepreg (FR-4) of glass fiber woven cloth impregnated with epoxy resin. Furthermore, each of the first electrically conductive portion 17A and the second electrically conductive portion 17B is configured with a copper foil applied onto the prepreg described above and an electroless gold plating film provided on the surface of the copper foil.

Figure 3A:
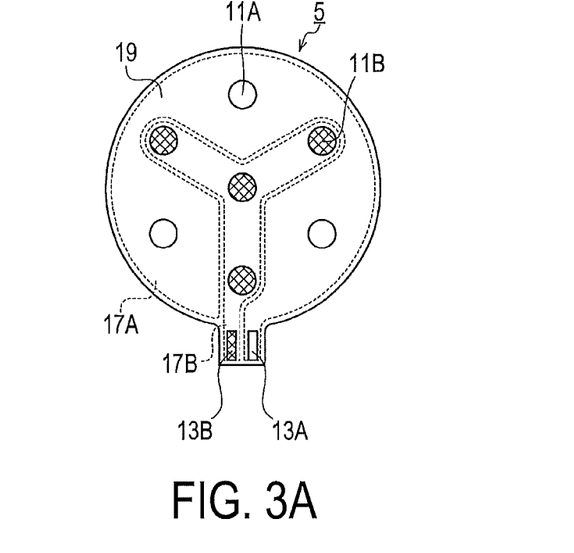
FIG. 3A is an explanatory diagram illustrating the shapes of a first conductive portion and a second conductive portion and the positional relationship between the conductive portions and electrodes.

The insulating layer 19 is configured with an insulating film obtained by applying a solder resist composition to a glass epoxy substrate. The first electrically conductive portion 17A and the second electrically conductive portion 17B are each formed in shapes as illustrated in FIG. 2B. As illustrated in FIG. 3A, for the first electrically conductive portion 17A and the second electrically conductive portion 17B formed in the shapes as just described, the insulating layer 19 covers the surface of the first electrically conductive portion 17A and the second electrically conductive portion 17B without covering the areas corresponding to the signal electrodes 11A, the ground electrodes 11B, the signal terminal 13A, and the ground terminal 13B.

As a result, the areas of the first electrically conductive portion 17A and the second electrically conductive portion 17B, which are not covered by the insulating layer 19, are exposed to the outside, and the signal electrodes 11A, the ground electrodes 11B, the signal terminal 13A, and the ground terminal 13B are configured with the exposed areas. Thus, the three signal electrodes 11A and the signal terminal 13A are electrically connected to each other to have the same potential. Furthermore, the four ground electrodes 11B and the ground terminal 13B are electrically connected to each other to have the same potential. Additionally, in FIG. 2B, for the first electrically conductive portion 17A and the second electrically conductive portion 17B, the second electrically conductive portion 17B is illustrated with the shaded area for the same purpose as that for the signal electrode 11A and the ground electrode 11B.

Figure 3B:
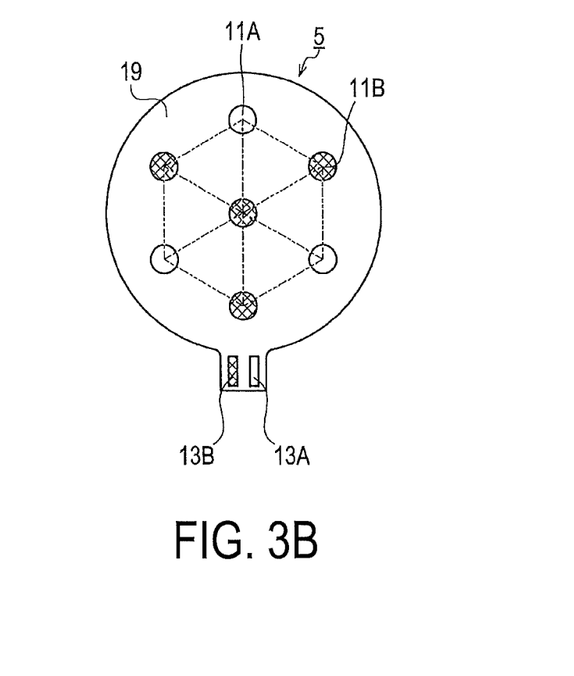
FIG. 3B is an explanatory diagram illustrating the positional relationship between the electrodes.

As illustrated in FIG. 3B, the centers of the respective electrodes are connected with a plurality of imaginary line segments (see imaginary lines in FIG. 3B) not intersecting with each other, and a plurality of triangular areas are defined by the line segments. In such a case, the signal electrodes 11A and the ground electrodes 11B are disposed such that at positions corresponding to vertexes of each of the triangular areas, at least one of the three electrodes is the signal electrode 11A and at least one of the three electrodes is the ground electrode 11B.

In the present embodiment, the triangular area is an equilateral triangular area. That is, the three electrodes at the positions corresponding to the vertexes of each of the triangular areas have an equal center-to-center distance from each other (in the present embodiment, the distance between the centers of the electrodes is approximately 9 mm, and the distance between the electrodes is approximately 6.3 mm). As a result, a pair of the signal electrode 11A and the ground electrode 11B always exists in any of the equilateral triangular areas, and the center-to-center distance between the pair of the signal electrode 11A and the ground electrode 11B is equal in any of the equilateral triangular areas.

The spacer 7 is a thin layer sandwiched between the variable resistor 3 and the electrode substrate 5 and having a thickness of approximately 0.1 mm. The spacer 7 has a plurality of holes 9 (seven holes in the present embodiment) as illustrated in FIG. 2A. The holes 9 are provided at positions corresponding to positions of the signal electrodes 11A and the ground electrodes 11B. Thus, the variable resistor 3 is located opposite the signal electrodes 11A and the ground electrodes 11B in a state where intervals equal to the thickness of the spacer 7 are provided between the variable resistor 3; and the signal electrodes 11A and the ground electrodes 11B. The spacer 7 is made of an acrylic adhesive. Therefore, the spacer 7 is interposed between the variable resistor 3 and the electrode substrate 5 and functions as an adhesive layer that bonds the variable resistor 3 and the electrode substrate 5.

Performance Test

Figure 4A:
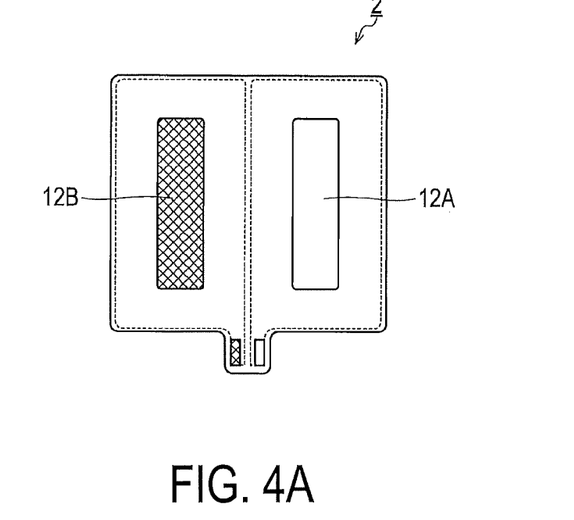
FIG. 4A is a front view illustrating a main part of a pressure sensor according to a comparative example.

The pressure sensitive performance of the pressure sensor 1 configured as described above was measured (example). For comparison, as illustrated in FIG. 4A, a pressure sensor 2 having electrodes and an electrode substrate, the shapes of which are different from those of the embodiment, were prepared, and the pressure sensing performance of the pressure sensor 2 was measured in the same manner as in the embodiment (a comparative example). The pressure sensor 2 includes a signal electrode 12A and a ground electrode 12B. The pressure sensor 2 is configured such that each of the signal electrode 12A and the ground electrode 12B is formed in a substantially rectangular shape and such that the signal electrode 12A and the ground electrode 12B are disposed in parallel at a constant interval in a direction orthogonal to the longitudinal direction. Note that, although not illustrated in FIGS. 2A and 2B, a spacer and a variable resistor, which are made of materials similar to those of the pressure sensor 1, are stacked on the signal electrode 12A and the ground electrode 12B.

Figure 4B:
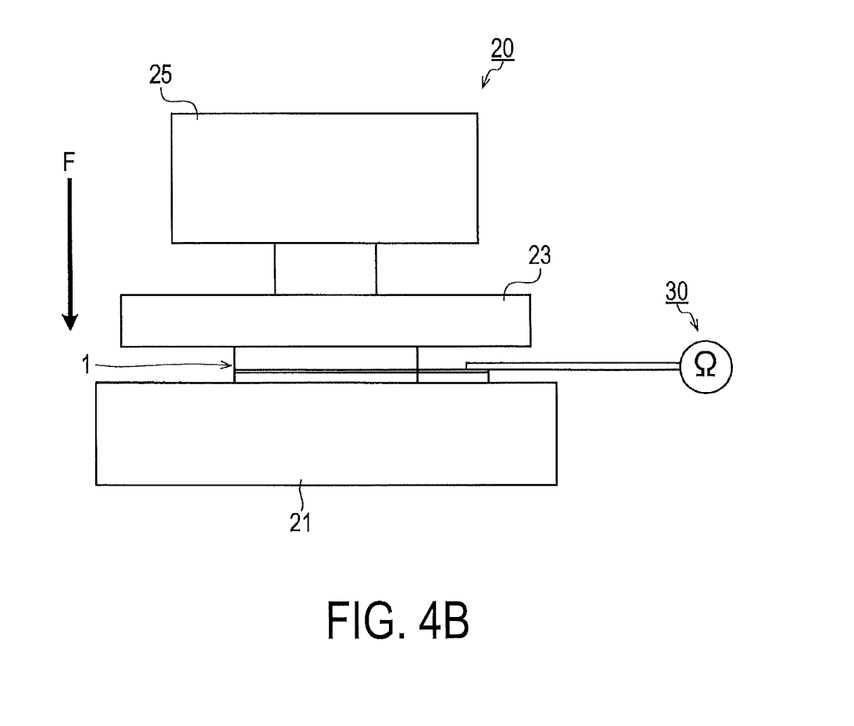
FIG. 4B is an explanatory diagram illustrating a schematic structure of test equipment.

A compression tester 20 and a resistance meter 30 were used as test equipment, the schematic structure of which is illustrated in FIG. 4B. The compression tester 20 is a commercially available instrument including a pedestal 21, an indenter 23, and a load cell 25. The resistance meter 30 is a commercially available multimeter capable of measuring voltage and current in addition to resistance.

In a test method, the pressure sensor was installed on the pedestal 21 of the compression tester 20. The resistance meter 30 was attached to the terminal of the pressure sensor. The compressive load was changed, and the changes in the resistance value at that time were measured. For the pressure applied to the pressure sensor, the stress [N] at the time of pressurization was acquired by the load cell 25, and the pressure [Pa] was calculated by dividing the stress by the pressurizing area. The measurement results are shown in Table 5.

Figure 5:
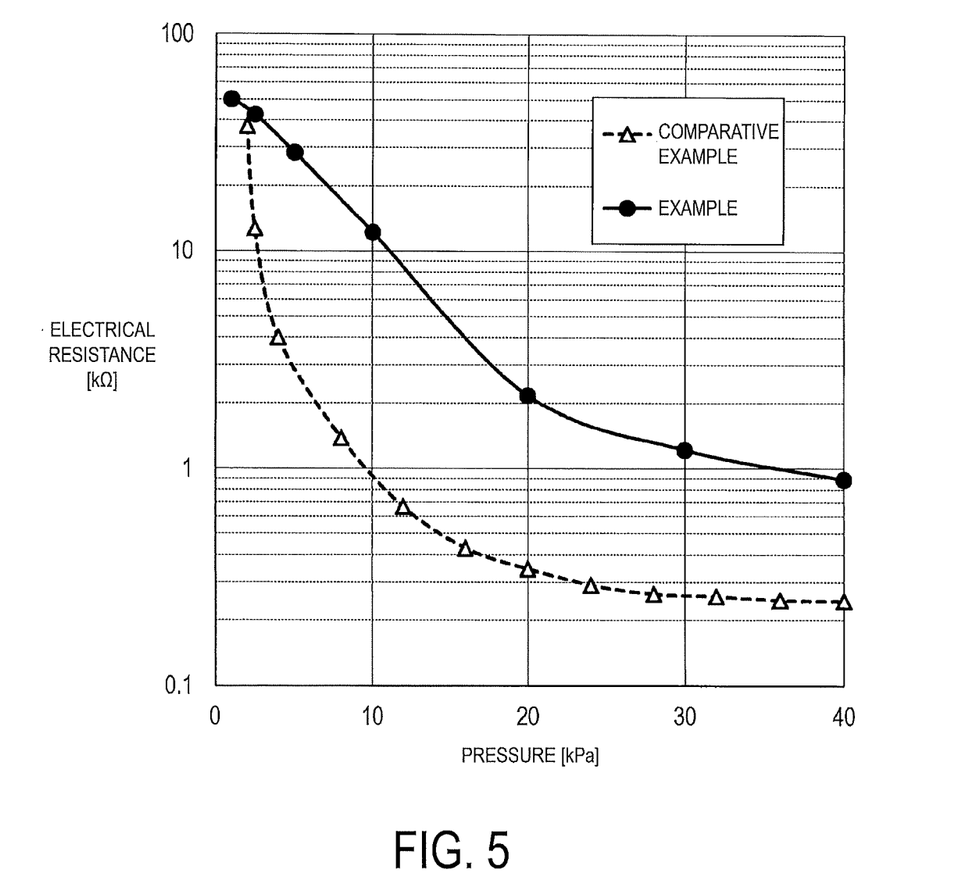
FIG. 5 is a graph showing pressure sensitive characteristics of an embodiment and a comparative example.

As is clear from the graph shown in FIG. 5, it is obvious that for the pressure sensor 1 according to the example, as compared with the pressure sensor 2 according to the comparative example, the electrical resistance appropriately changes in a wide range from a low load region to a high load region when pressure is changed. In contrast, for the pressure sensor 2 according to the comparative example, the electric resistance changes greatly in a low load region where pressure is below 20 kPa, and meanwhile, as compared with the low load region, the electrical resistance does not change greatly in a high load region where pressure is 20 kPa or greater. In particular, for the pressure sensor 2 according to the comparative example, in a case that pressure is equal to or greater than 30 kPa, the change in electrical resistance is extremely small; therefore, it is difficult to precisely detect a slight change in pressure in such a high load region. In contrast, for the pressure sensor 1 according to the embodiment, the electric resistance changes greatly even in a case where pressure is equal to or greater than 30 kPa. Thus, as compared with the pressure sensor 2 according to the comparative example, the pressure sensor 1 according to the embodiment has a higher resolution during the pressure measurement and can precisely detect a slight change in pressure.

Beneficial Effects

According to the pressure sensor 1 described above, the variable resistor 3 is made of the electrically conductive foam elastomer material as described above. Thus, the surface of a pressure sensitive portion can be made soft compared with a pressure sensor configured with a non-foaming electrically conductive material (for example, electrically conductive rubber or the like). Therefore, such a pressure sensor 1 can provide a reduced sensation of a foreign body even when being placed on a portion to be touched by a person.

Consequently, such a pressure sensor 1 can be utilized as a sensor, for example, adapted to be incorporated into a chair to monitor the posture of a person seated on the chair. Alternatively, for example, the pressure sensor 1 may be utilized as a sensor, for example, adapted to be incorporated into a shoe to confirm the movement of the center of gravity in a case that a person is walking. In a case where a walking state can be monitored as just described, the monitoring of the walking state can be used for the countermeasures against lifestyle-related diseases. Alternatively, for example, the pressure sensor 1 may be incorporated into a bed to record shifting of the weight during bedtime. This can be utilized to improve the quality of sleep.

Additionally, the pressure sensor 1 described above is configured such that the electrical resistance of the variable resistor 3 decreases with the compression amount. Therefore, unlike a pressure sensor configured such that electrical resistance decreases with the contact area between interdigital electrodes and a resistor layer, the electrical resistance of the variable resistor 3 changes in a case that the compression amount of the variable resistor 3 changes. In addition, the pressure sensor 1 described above is configured such that the signal electrodes 11A and the ground electrodes 11B are disposed at the characteristic positions as illustrated in FIG. 3B. As illustrated in FIG. 5, this can minimize a sharp decrease in the electrical resistance when a certain amount of pressure is applied, and the electrical resistance appropriately changes over the entire region from the low load region to the high load region. As a result, pressure can be appropriately detected from the low load region to the high load region.

OTHER EMBODIMENTS

The exemplary embodiment has been used to describe the pressure sensor, but the foregoing embodiment is only an example of one aspect according to the present disclosure. In other words, the present disclosure is not limited to the exemplary embodiment described above and can be embodied in various forms without departing from the technical concept of the present disclosure.

Figure 6A:
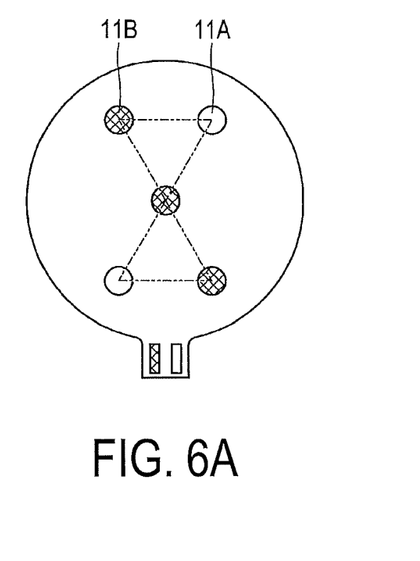
FIG. 6A is a front view illustrating a main part of a pressure sensor according to a first modified example.
Figure 6B:
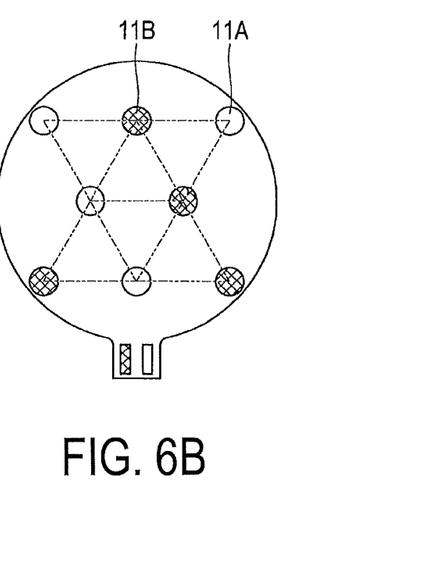
FIG. 6B is a front view illustrating a main part of a pressure sensor according to a second modified example.

For example, in the embodiment described above, an example where the three signal electrodes 11A and the four ground electrodes 11B are provided is illustrated, but the number of electrodes is not limited to a specific number. For example, as illustrated in FIG. 6A, two signal electrodes 11A and three ground electrodes 11B may be provided. Likewise, in this case, the electrodes can be each disposed at positions corresponding to vertexes of equilateral triangular areas. Alternatively, as illustrated in FIG. 6B, four signal electrodes 11A and four ground electrodes 11B may be provided. Likewise, in this case, the electrodes can be each disposed at positions corresponding to vertexes of equilateral triangular areas. The number of electrodes may be adjusted as appropriate in consideration of, for example, the area of the pressure sensitive portion (variable resistor), the area of the electrode, the distance between the electrodes, the resistance value of the variable resistor, and the like in the pressure sensor.

Figure 6C:
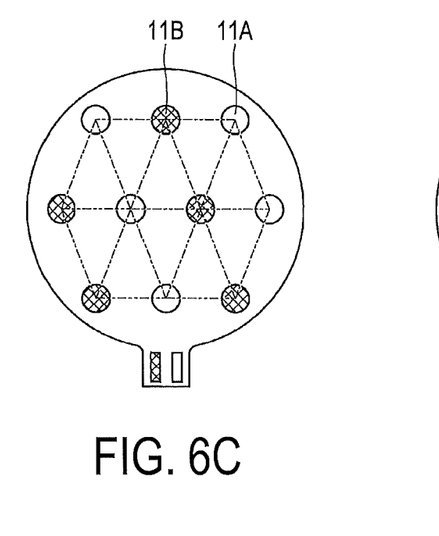
FIG. 6C is a front view illustrating a main part of a pressure sensor according to a third modified example.

Further, in the embodiment described above, an example where the electrodes are each disposed at the positions corresponding to the vertexes of the equilateral triangular areas is illustrated, but the positions at which the electrodes are each disposed are not limited to the positions corresponding to the vertexes of the equilateral triangular areas. In a particular example, for example, as illustrated in FIG. 6C, the electrodes may be disposed at positions corresponding to vertexes of isosceles triangular areas. Likewise, in this case, at least one of the three electrodes at the vertexes of the isosceles triangular area is the signal electrode 11A, and at least one of the three electrodes of the isosceles triangular area is the ground electrode 11B.

In the example illustrated in FIG. 6C, the distance between the electrodes is provided in two ways. As long as the distance between the electrodes, which is provided in two ways, is not excessively large or not excessively small, the distance between the electrodes being provided in two ways is not problematic by itself. However, in the example illustrated in FIG. 6C, two equal sides of the isosceles triangle are longer than the other side of the isosceles triangle. Accordingly, in a case where the length of the two equal sides of the isosceles triangle is set as an optimal distance between the electrodes, the length of the other side of the isosceles triangle is shorter than the optimal distance between the electrodes. Therefore, in this case, it is preferable to set the shape and size of the isosceles triangular area such that the length of the other side of the isosceles triangle is not excessively small. In contrast, in a case where the length of the other side of the isosceles triangle is set as an optimal distance between the electrodes, the length of the two equal sides of the isosceles triangle is longer than the optimal distance between the electrodes. Consequently, in this case, it is preferable to set the shape and size of the isosceles triangular area such that the length of the two equal sides of the isosceles triangle is not excessively large.

In a case where the optimal distance between the electrodes is within a certain numerical range, the lengths of the two sides and the other side of the isosceles triangle may be selected within the numerical range. However, in a case that the electrodes are disposed at the positions corresponding to the vertexes of the equilateral triangular areas, an optimal distance between the electrodes can be set, and at the same time, the plurality of electrodes can be disposed closest to one another while maintaining the optimal distance between the electrodes. Consequently, in view of increasing the electrode density, it is preferable that the electrodes be each disposed at the positions corresponding to the vertexes of the equilateral triangular areas.

Figure 6D:
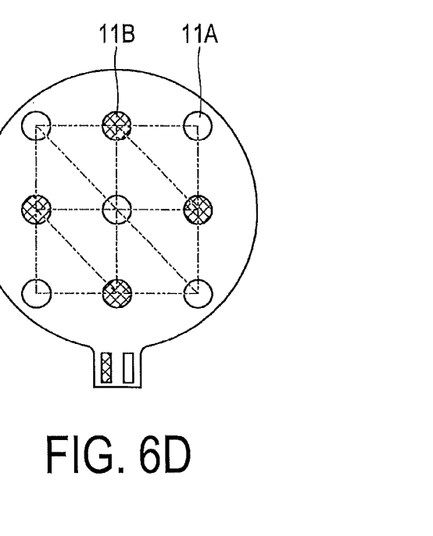
FIG. 6D is a front view illustrating a main part of a pressure sensor according to a fourth modified example.

Alternatively, for example, as illustrated in FIG. 6D, the electrodes may be disposed at positions corresponding to vertexes of isosceles right triangular areas. In an example illustrated in FIG. 6D, the electrodes are substantially disposed at positions corresponding to vertexes of square areas. Likewise, in this case, at least one of the three electrodes at the vertexes of the isosceles right triangular area is the signal electrode 11A, and at least one of the three electrodes at the vertexes of the isosceles right triangular area is the ground electrode 11B.

Furthermore, in the embodiment described above, an example in which a styrene-based elastomer is used as a base material is illustrated. A styrene-ethylene-ethylene-propylene-styrene block copolymer (SEEPS) is illustrated as the styrene-based elastomer. Alternatively, another type of styrene-based elastomer may be used. For example, in addition to the aforementioned SEEPS, a styrene-isoprene-styrene block copolymer (SIS), a styrene-butadiene-styrene block copolymer (SBS), a styrene-ethylene-propylene block copolymer (SEP), a styrene-ethylene-butylene-styrene block copolymer (SEBS), a styrene-ethylene-propylene-styrene block copolymer (SEPS), and the like may be used. One kind of these styrene-based elastomers can be used alone, or two or more kinds of these styrene-based elastomers can be used as a mixture.

Alternatively, an elastomer material other than a styrene-based elastomer may be applied as a base material. For example, a silicone rubber may be used, and more specifically, a vinyl-methyl-silicone rubber, a methyl-silicone rubber, a phenyl-methyl-silicone rubber, a fluorosilicone rubber, and the like can be used. One kind of these silicone rubbers can be used alone, or two or more kinds of these silicone rubbers can be used as a mixture.

Also, in the embodiment described above, the vapor grown carbon fibers are used as electrically conductive fillers. Alternatively, other electrically conductive fillers may be used. Examples of other electrically conductive fillers include carbon fibers other than vapor grown carbon fibers, graphite, and metallic powder.

Moreover, in the embodiment described above, an example where the distance between the electrodes is approximately 6.3 mm is illustrated. Alternatively, the plurality electrodes need only be disposed at intervals of 0.5 mm or greater from each other.

Supplementary Description

Note that as is clear from the exemplary embodiment described above, the pressure sensor according to the present disclosure may be further provided with configurations such as those given below.

First, the pressure sensor according to the present disclosure may include the plurality of electrodes disposed in each of the plurality of triangular areas such that each of three internal angles of each of the plurality of triangular areas is an acute angle or a right angle.

According to the pressure sensor configured in this manner, each of the three internal angles of each triangular area is an acute angle or a right angle. Therefore, the length of the side opposite an obtuse angle (that is, one side other than two sides forming the obtuse angle) can be prevented from being excessively large compared to a case where one of the internal angles is an obtuse angle. Consequently, according to the pressure sensor of the present disclosure, in a case that the plurality of electrodes are disposed such that a distance equal to or greater than a predetermined distance is secured between the plurality of electrodes, the plurality of electrodes can be disposed closer to each other compared with a case where one of the internal angles is an obtuse angle. As a result, the sensitivity of the pressure sensor can be further enhanced corresponding to that configuration.

Further, the pressure sensor according to the present disclosure may include the plurality of electrodes disposed such that each of the plurality of triangular areas is an equilateral triangular area.

According to the pressure sensor configured in this manner, each of the areas is an equilateral triangular area. Therefore, compared to a case where each of the areas is not an equilateral triangular area, neither one side nor two sides of the triangle can be longer than the other side. Consequently, according to the pressure sensor of the present disclosure, in a case that the plurality of electrodes are disposed such that a distance equal to or greater than a predetermined distance is secured between the plurality of electrodes, the plurality of electrodes can be disposed closer to each other compared with a case where each of the areas is not an equilateral triangular area. As a result, the sensitivity of the pressure sensor can be further enhanced corresponding to that configuration.

Furthermore, the pressure sensor according to the present disclosure may include the plurality of electrodes disposed at intervals of 0.5 mm or greater from each other.

According to the pressure sensor configured in this manner, unlike a pressure sensor including electrodes disposed at intervals of below 0.5 mm, microfabrication is not required at the time of forming the electrodes. Thus, the productivity of the pressure sensor can be increased.

Additionally, the pressure sensor according to the present disclosure includes the base member configured in a planar shape, the plurality of electrodes are disposed on one surface of the base member, and the variable resistor is configured in a planar shape and overlaps with the one surface of the base member. Thus, the plurality of electrodes may be sandwiched between the base member and the variable resistor.

According to the pressure sensor configured in this manner, the plurality of electrodes are supported by the base material even in a case where the variable resistor is deformed by pressure. As a result, the designed distance between the electrodes can be appropriately maintained.

REFERENCE SIGNS LIST

1 Pressure sensor, 3 Variable resistor, 5 Electrode substrate, 7 Spacer, 9 Hole, 11A Signal electrode, 11B Ground electrode, 13A Signal terminal, 13B Ground terminal, 14A, 14B Lead wire, 15 Base member, 17A First electrically conductive portion, 17B Second electrically conductive portion, 19 Insulating layer, 20 Compression tester, 21 Pedestal, 23 Indenter, 25 Load cell, 30 Resistance meter.

The invention claimed is:

1. A pressure sensor, comprising:
a variable resistor made of an electrically conductive foam elastomer material that is a material imparted with electrical conductivity by dispersing electrically conductive fillers into an elastomer material and obtained by foaming the elastomer material, the variable resistor being configured to be compressed depending on pressure in a case that the variable resistor is applied with pressure, an electrical resistance of the variable resistor decreasing with a compression amount; and
a plurality of electrodes disposed at intervals from each other on one surface in contact with the variable resistor,
wherein in a case where the centers of the respective electrodes are connected with a plurality of imaginary line segments not intersecting with each other and where a plurality of triangular areas are defined by the plurality of imaginary line segments, the plurality of electrodes are disposed such that at positions corresponding to vertexes of each of the plurality of triangular areas, at least one of three electrodes of the plurality of electrodes is a signal electrode and at least one of the three electrodes is a ground electrode, and
a plurality of the signal electrodes are electrically connected to each other to have the same potential and a plurality of the ground electrodes are electrically connected to each other to have the same potential.

2. The pressure sensor according to claim 1, wherein the plurality of electrodes are disposed in each of the plurality of triangular areas such that each of three interior angles of each of the plurality of triangular areas is an acute angle or a right angle.

3. The pressure sensor according to claim 2, wherein the plurality of electrodes are disposed such that each of the plurality of triangular areas is an equilateral triangular area.

4. The pressure sensor according to claim 1, wherein the plurality of electrodes are disposed at intervals of 0.5 mm or greater from each other.

5. The pressure sensor according to claim 1, further comprising:
a base member configured in a planar shape,
wherein the plurality of electrodes are provided on one surface of the base member,
the variable resistor is configured in a planar shape and overlaps with the one surface of the base member, and
the pressure sensor has a configuration in which the plurality of electrodes are sandwiched between the base member and the variable resistor.

6. The pressure sensor according to claim 2, wherein the plurality of electrodes are disposed at intervals of 0.5 mm or greater from each other.

7. The pressure sensor according to claim 3, wherein the plurality of electrodes are disposed at intervals of 0.5 mm or greater from each other.

8. The pressure sensor according to claim 2, further comprising:
a base member configured in a planar shape,
wherein the plurality of electrodes are provided on one surface of the base member,
the variable resistor is configured in a planar shape and overlaps with the one surface of the base member, and
the pressure sensor has a configuration in which the plurality of electrodes are sandwiched between the base member and the variable resistor.

9. The pressure sensor according to claim 3, further comprising:
a base member configured in a planar shape,
wherein the plurality of electrodes are provided on one surface of the base member,
the variable resistor is configured in a planar shape and overlaps with the one surface of the base member, and
the pressure sensor has a configuration in which the plurality of electrodes are sandwiched between the base member and the variable resistor.

10. The pressure sensor according to claim 4, further comprising:

a base member configured in a planar shape,
wherein the plurality of electrodes are provided on one surface of the base member,
the variable resistor is configured in a planar shape and overlaps with the one surface of the base member, and
the pressure sensor has a configuration in which the plurality of electrodes are sandwiched between the base member and the variable resistor.

* * * * *